April 9, 1929.　　　R. B. STUCKEY　　　1,708,338
BRAKE
Filed Feb. 13, 1928　　　2 Sheets-Sheet 1

Inventor
Robert B. Stuckey
By [signature]
Attorney

April 9, 1929.  R. B. STUCKEY  1,708,338
BRAKE
Filed Feb. 13, 1928  2 Sheets-Sheet 2

Inventor
Robert B. Stuckey
By Faust F. Crampton
Attorney

Patented Apr. 9, 1929.

1,708,338

UNITED STATES PATENT OFFICE.

ROBERT B. STUCKEY, OF BUCYRUS, OHIO, ASSIGNOR TO W. A. RIDDELL COMPANY, OF BUCYRUS, OHIO, A CORPORATION OF OHIO.

BRAKE.

Application filed February 13, 1928. Serial No. 253,839.

My invention has for its object to provide a brake for heavy duty road machinery which is so constructed as to frictionally, yet securely, grip a rotatable part of the driving mechanism, and so that it may be located as to be readily manipulated by the operator of the machine. The invention is particularly adapted for the control of the bull wheels, or rollers, of a road machine, to securely hold the wheels or rollers against movement, particularly on a hillside, the control mechanism being of such a character that a very high pressure may be produced over a large area that is intensified automatically by continued movement of the bull wheels or rollers.

The invention may be contained in self-controlling heavy duty machinery of different kinds and, to illustrate a practical application of the invention, I have selected a road roller that contains the invention, and shall describe it hereinafter. The roller selected is shown in the accompanying drawings.

Figure 1:
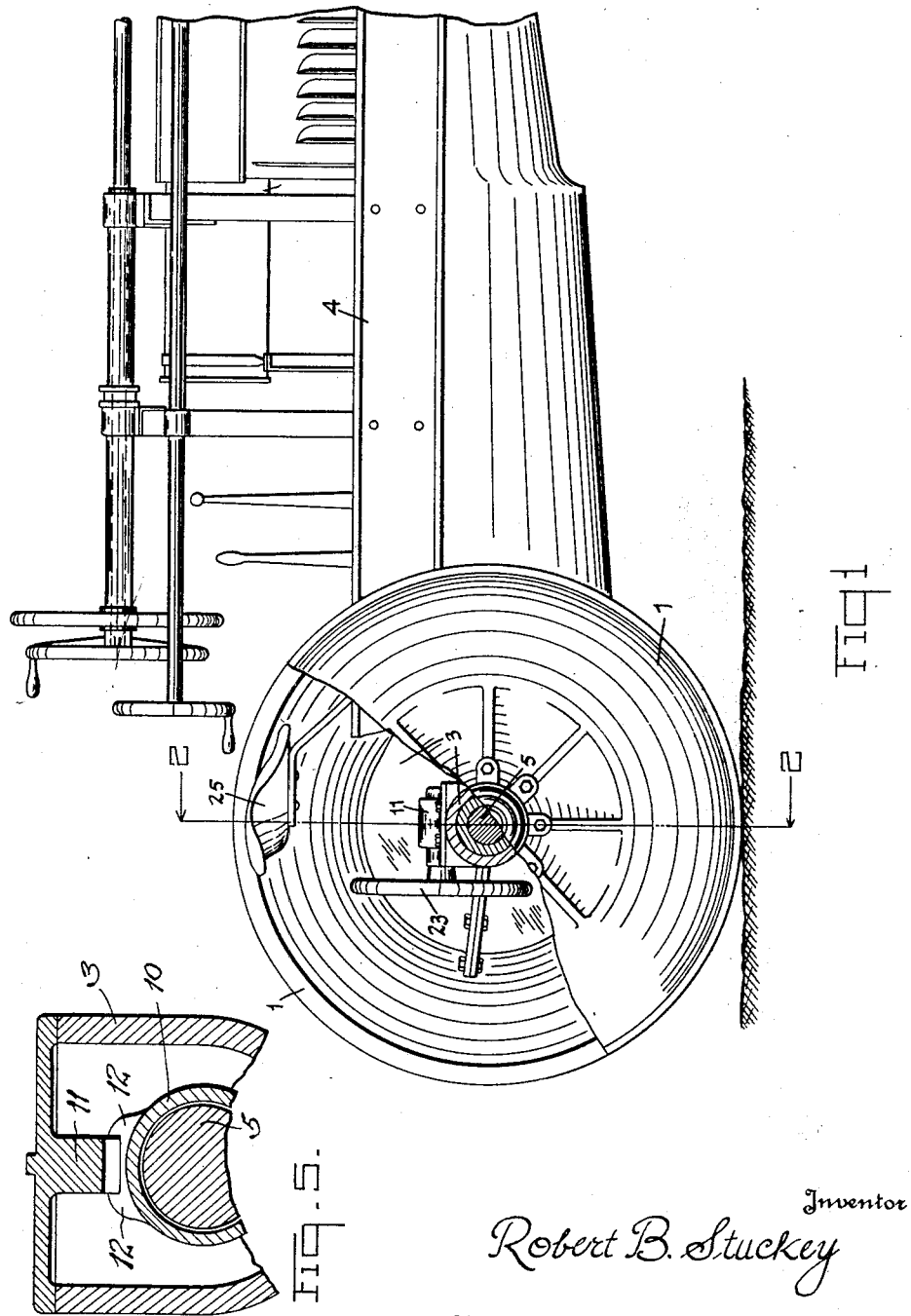
Figure 2:
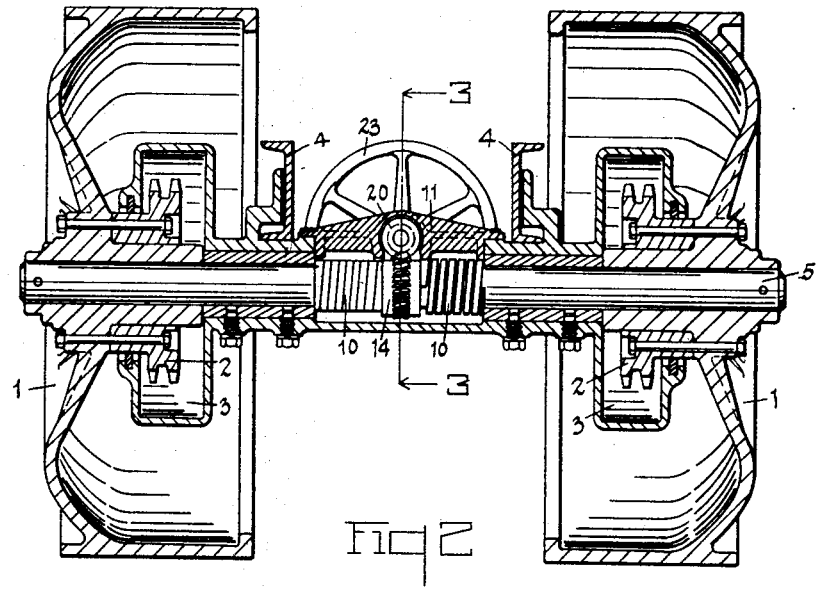
Figures 3, 4:
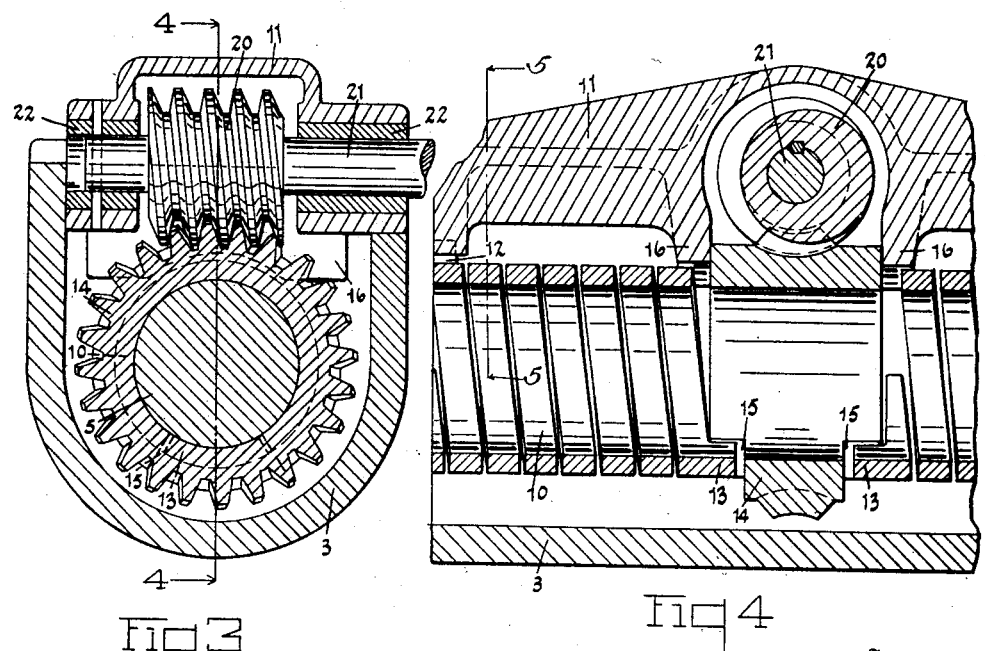

Fig. 1 of the drawings illustrates a side view of the rear end port of the road machine referred to. Fig. 2 is a view of a section taken on the plane of the line 2—2 indicated in Fig. 1. Fig. 3 is a view of a section taken on the plane of the line 3—3 indicated in Fig. 2. Fig. 4 is a view of a section taken on the plane of the line 4—4 indicated in Fig. 3 except that the shaft shown in Fig. 3 is shown as removed in Fig. 4. Fig. 5 is a view of a section taken on the plane of the line 5—5 indicated in Fig. 4.

The road machine shown in the drawings is provided with a pair of heavy bull wheels, or rollers, 1, that are also used for traction purposes for driving the machine. The rollers, or traction wheels 1, are driven by a suitable engine which, by reduced gearing, is connected to a double sprocket wheel 2 located within each of the rollers. The sprocket wheels 2 and the driving sprockets and chains are located in the housing 3 that is connected to the frame 4 of the machine. A shaft 5 is keyed, or otherwise connected, to the rollers or traction wheels 1 and is suitably supported in bearings formed in the housing 3. A pair of spiral springs 10 are also located in the housing, the spiral springs have a rectangular cross-section and surround the shaft 5 over a considerable length and, consequently, cover a considerable area of the surface of the shaft. The outer ends of the spiral springs are connected to the housing 3. Preferably, the housing 3, at its central point, has a cover plate 11 that may be securely bolted to the housing and the outer ends of the springs 10 are provided with lugs 12 that protrude so as to engage the cover plate 11, as shown in Figs. 4 and 5. The inner ends of the springs are bent towards each other, or are formed with lugs or enlargements 13. A gear wheel 14 is located on the shaft 5 between the springs 10 and is provided with recesses 15 in which the lugs or enlargements formed on the inner ends of the springs 10 are located. The gear wheel 14 is rotatably supported on the shaft 5 and is secured as against material endwise movement along the shaft by flanges 16 that protrude from the cover plate 11 and which engage the edge portions of the lateral faces of the gear wheel 14. The gear wheel is operated by worm 20 that is located on the shaft 21 and is rotatably supported in bearings 22 formed in the cover plate 11. A hand wheel 23 is connected to the shaft 21 for rotating the worm 20 and, in turn, operating the worm gear wheel 14. Rotation of the hand wheel 23 will cause one of the springs 10 to tighten on the shaft 5 and will tend to operate to loosen the other of the springs 10 from the surface of the shaft.

When it is desired to stop the forward movement of the road machine, or when the inclination of the road bed is such as to cause the road machine to move forward, one of the springs 10 is tightened by the operation of the hand wheel 23 and when the reverse occurs, that is, where it is desired to stop the road machine from rearward movement, either by the momentum of the road machine or the inclination or grade of the road bed, the hand wheel may be operated in the reverse direction to rotate the worm gear wheel 14 in the opposite direction and thus cause the other of the springs to engage with the shaft. The springs, being rectangular in their cross section form and covering a considerable area of the shaft, will securely grip the surface of the shaft and resist the movement of the bull wheels and, consequently, cause the bull wheels to brake and hold the machine. Furthermore, the turns of the springs are in such a direction, with respect to the axis of the shaft, that when one of the springs is tightened by the operation of the worm gear wheel 14, the other of the springs will be loosened. When the inner end of either of the springs 10 are brought against the surface of the shaft, continued movement of the shaft that may be induced by the momentum of the machine or the inclination or grade of the road bed will cause an increased pressure by continued winding of the spring which will further increase the frictional engagement of each spring on the shaft 5. Thus, when the road machine is moving forward and is to be held against forward movement, the left hand spring, as shown in Fig. 2, is tightened on the shaft and the turns of the spring are such that any movement of the shaft 5, caused by the forward movement of the machine, will cause the spring to further tighten on the shaft. The same is true with reference to the right hand spring where there is a force tending to produce a rearward movement of the machine after the spring has been drawn against the surface of the shaft by the operation of the worm gear wheel.

In controlling heavy machinery of the character referred to, it is found necessary to operate the brake mechanism by a reduction gear that is so placed and constructed that it may be readily manipulated by the driver. The seat 25 for the driver is connected to the frame of the machine so as to locate the seat 25 slightly in front of and above the hand wheel 23, so that the driver may manipulate the brake by merely extending his hand to a point below the seat and at the rear of the seat. Thus, there is afforded a controlling means for the brake of the machine at a point that it may be conveniently operated and yet at a point where there will be substantially a direct connection between the hand wheel and the brake itself.

I claim:

1. In a brake mechanism for road machinery, a frame, a pair of traction wheels, a shaft connected to the traction wheels, means for driving the wheels and the shaft, a housing surrounding the shaft and connected to the frame, a gear wheel located on the shaft and within the housing, a pair of spiral springs having a rectangular cross section surrounding the shaft and connected to the housing and the gear wheel and located on opposite sides of the gear wheel, a hand wheel for operating the gear wheel to tighten one of the springs on the shaft when the hand wheel is rotated in one direction and to tighten the other of the springs when the hand wheel is rotated in the other direction.

2. In a brake mechanism for tractors, a pair of traction wheels, a shaft connected to the traction wheels, means for driving the traction wheels and the shaft, a housing surrounding the shaft, a gear wheel located on the shaft and within the housing, a pair of spiral springs having a rectangular cross section located on the shaft and on opposite sides of the gear wheel, the outer ends of the springs connected to the housing, the gear wheel having recesses on opposite sides thereof and the spring having turned end portions engaging the said recesses, a hand wheel for operating the gear wheel to tighten one of the springs on the shaft when the gear wheel is rotated in one direction and to tighten the other of the springs on the shaft when the gear wheel is rotated in the opposite direction.

3. In a brake mechanism for road machinery, a frame, a seat for the operator connected to the frame, a pair of traction wheels, a shaft connected to the traction wheels, means for driving the traction wheels and the shaft, a housing surrounding the shaft, a gear wheel located on the shaft, a pair of spiral springs located on the shaft and on opposite sides of the gear wheel, the outer ends of the springs connected to the housing and the inner ends connected to the gear wheel, a hand wheel located in proximity to the seat and connected to the gear wheel, the gear wheel operating to tighten one of the springs on the shaft when rotated in one direction and to tighten the other of the springs on the shaft when rotated in the other direction.

4. In a brake mechanism for road rollers, a frame, a seat for the operator connected to the frame, a pair of rollers, a shaft connected to the rollers, means for driving the rollers and the shaft, the shaft located beneath the seat, a housing located below the seat and surrounding the shaft, a gear wheel located on the shaft, a pair of spiral springs having a rectangular cross section located on the shaft and connected to the housing and the gear wheel, a hand wheel located back of the seat for rotating the gear wheel, the gear wheel operating to tighten one of the springs on the shaft when the gear wheel is rotated in one direction and to tighten the other of the springs on the shaft when the gear wheel is rotated in the opposite direction.

In witness whereof I have hereunto signed my name to this specification.

ROBERT B. STUCKEY.